L. W. WYMAN.
WATERING TROUGH.
APPLICATION FILED MAR. 17, 1919.
1,330,995.
Patented Feb. 17, 1920.
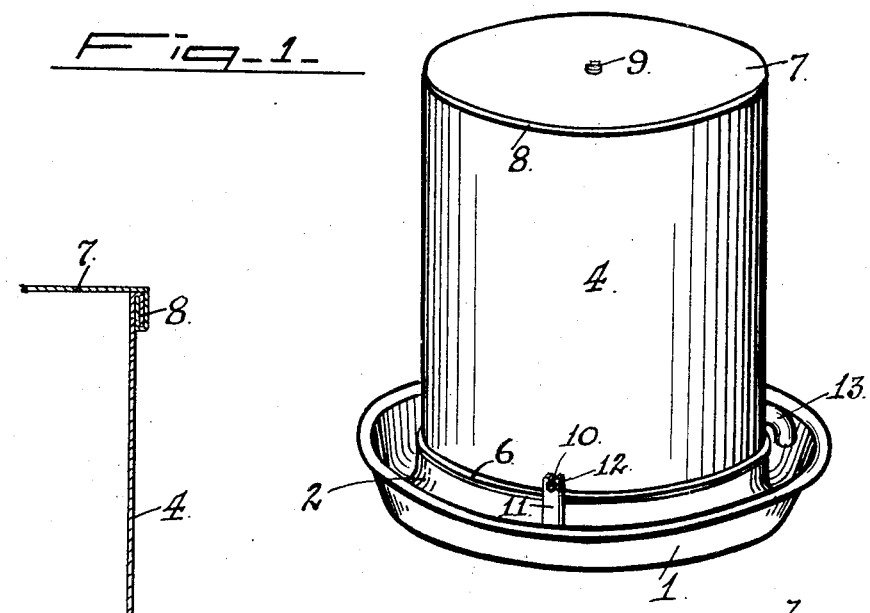
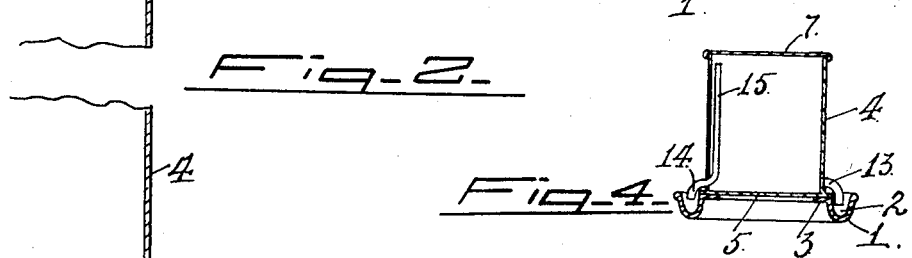
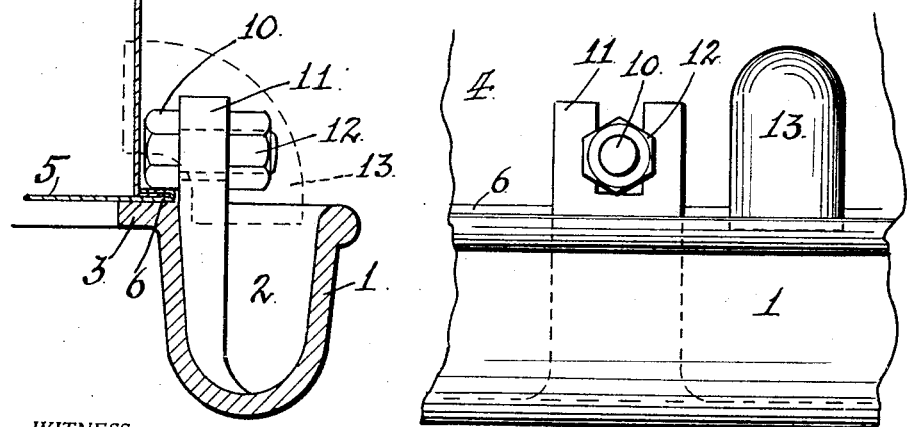
WITNESS
W<sup>m</sup> F. Drew
INVENTOR
Laurence West Wyman
BY
Booth & Booth
ATTORNEYS

UNITED STATES PATENT OFFICE.

LAURENCE WEST WYMAN, OF OAKLAND, CALIFORNIA, ASSIGNOR TO CALIFORNIA CORRUGATED CULVERT COMPANY, OF OAKLAND, CALIFORNIA, A CORPORATION OF CALIFORNIA.

WATERING-TROUGH.

1,330,995.   Specification of Letters Patent.   Patented Feb. 17, 1920.

Application filed March 17, 1919. Serial No. 283,167.

*To all whom it may concern:*

Be it known that I, LAURENCE WEST WYMAN, a citizen of the United States, residing at Oakland, in the county of Alameda and State of California, have invented certain new and useful Improvements in Watering-Troughs, of which the following is a specification.

My invention relates to watering-troughs of the type in which a closed reservoir supply of water is drawn upon automatically through an exit, the entrance to which of the displacing air, is controlled by the level of the water in the exposed trough portion of the device. This form of watering-trough is especially adapted for animals such as hogs, turkeys, chickens, ducks and other poultry having a propensity to get into the trough, in that a relatively small body of water is exposed, which is ample for their needs, and is adapted to be automatically replenished according to the rate of consumption.

To provide a trough of this character in which the exposed water body is contracted by a positive barrier wall preventing the animals from getting into the water; which is of sufficient stability to withstand the rough usage of such animals as hogs; and which, moreover, is of simple and economical manufacture is the object of my invention; and to this end my invention consists in the novel watering-trough which I shall hereinafter fully describe, by reference to the accompanying drawings, in which—

Figure 1 is a perspective view of my watering-trough.

Fig. 2 is a broken vertical sectional view, enlarged, of the same.

Fig. 3 is a detail elevation, enlarged, of the lower portion of the structure. Fig. 4 is a sectional view showing an alternative form of the structure.

1 is a relatively heavy, cast iron base insuring stability. This base is formed as a trough 2 and, though it may be of any shape in contour, is best in annular form to give maximum access for the animals in the use of the trough. The inner wall of the trough-base is formed at its top with a flange 3, as seen in Fig. 2.

Upon this flange is supported the reservoir member 4 which is relatively light, being made of sheet metal.

This reservoir member is a closed vessel having a tight bottom 5 united to it by an outwardly projecting seam 6, and a tight top 7 secured by a seam 8. In the top 7 is a filling plug 9. The reservoir member 4 is firmly secured to the trough base 1, by means of bolts 10, the heads of which clamp down upon the seam 6 of the reservoir bottom, said bolts being carried in the slotted tops of the lugs 11, of which, in practice, there are three, cast with the trough-base. Nuts 12 hold the bolts in clamping relation, and permit the separation, when needed, of the reservoir from the base. Fitted to the lower portion of the reservoir member 4 is an elbow nipple 13 which is downturned into trough space 1 to a level predetermined for the water therein, but which is not higher than that of the top of the inner flange 3 of the base, so that the base of the reservoir member 4 is clear of the water in said space.

In use, as the animals drink, the level of the water in the trough space of the base 1 lowers, and when this level gets below the end of the nipple 13, so that displacing air can enter, water from the reservoir will flow from the nipple until the water level in said space again rises and covers the nipple end, whereupon the flow will cease.

It will be seen that in the construction of this device, the reservoir member 5 also serves, by reason of its height and position, as a positive and effective barrier wall, thus preventing the animals from getting into the trough. The contraction of the trough thus effected is a matter of intent, leading to prohibition of invasion. Its circular or annular shape also assists in this regard, and all these considerations result in cleanliness which is the essential object.

It will be seen that the construction of the cast iron base is such as to raise the sheet metal reservoir 4 out of the mud and consequently away from corrosive conditions. In the alternative form of Fig. 4, there is an elbow nipple 14, which is fitted with a tube 15 rising inside the reservoir and opening therein near its top. The mouth of this nipple 14 lies above the level of the mouth of nipple 13, so that while the latter still delivers the water, no air enters through it. The air for displacement enters through nipple 14 and tube 15 to the surface of the water; and its entrance is faster than if it had to bubble up through the water. Consequently, the discharge of water through the nipple 13 is faster, thus taking care of the rapid consumption.

I claim:—

1. A watering-trough comprising a trough-base-member; a closed reservoir member having an outwardly extending bottom seam resting and supported on the top of the inner wall of the trough-base-member; means for clamping said bottom seam of the reservoir member upon the top of said inner wall, consisting of lugs rising from the trough-base-member and bolts in the lugs engaging said seam; and an outlet nipple fitted to the reservoir member and opening into the trough-space of the base member below the top of said space.

2. A watering-trough comprising a trough-base-member; a closed reservoir member having an outwardly extending bottom seam resting and supported on the top of the inner wall of the trough-base-member; means for clamping said bottom seam of the reservoir member upon the top of said inner wall, consisting of lugs rising from the trough-base-member and provided with slotted upper ends, bolts in said slotted ends, the heads of said bolts bearing on said seam, and nuts on the bolts; and an outlet nipple fitted to the reservoir member and opening into the trough-space of the base member below the top of said space.

3. A watering-trough comprising an annular trough-base-member; a closed cylindrical reservoir member having an outwardly projecting bottom seam, resting upon the top of the inner wall of the trough-base-member; a plurality of lugs rising from the inner surface of the inner wall of the trough-base-member; bolts carried by said lugs and adapted to clamp the seam of the reservoir member down on said inner wall; and a nipple fitted to the reservoir member and opening into the trough-space of the base member below the top of said space.

4. A watering-trough comprising an annular trough-base-member; a closed cylindrical reservoir member having an outwardly projecting bottom seam, resting upon the top of the inner wall of the trough-base-member; a plurality of lugs rising from the inner surface of the inner wall of the trough-base-member, said lugs having slotted tops, bolts carried in the slotted tops of said lugs, the heads of the bolts bearing on the seam of the reservoir member to clamp it to its seat; nuts on said bolts; and a nipple fitted to the reservoir member and opening into the trough-space of the base member below the top of said space.

5. A watering-trough comprising an annular, relatively heavy cast iron trough-base-member having cast with the inner surface of its inner wall a plurality of uprising lugs with slotted tops; a relatively light sheet metal cylindrical closed reservoir member having an outwardly projecting bottom seam resting upon the top of the inner wall of the trough-base-member; bolts carried in the slotted tops of the lugs, with their heads bearing on and clamping the bottom seam of the reservoir member down upon the top of the inner wall of the trough-base-member; nuts on the bolts to hold them in place; and a nipple fitted to the reservoir member and opening into the trough-space of the base-member on a level at or below the top of the inner wall of said trough-space.

In testimony whereof I have signed my name to this specification in the presence of two subscribing witnesses.

LAURENCE WEST WYMAN.

Witnesses:
S. A. FORD,
E. W. FRATERS.